United States Patent
Ha et al.

(10) Patent No.: US 12,381,488 B2
(45) Date of Patent: Aug. 5, 2025

(54) VEHICLE FOR CONVERTING POWER OF BATTERY AND METHOD OF CONTROLLING THE SAME

(71) Applicants: Hyundai Motor Company, Seoul (KR); Kia Corporation, Seoul (KR)

(72) Inventors: Tae Jong Ha, Songpa-gu (KR); Jun Young Lee, Daegu (KR); Dae Woo Lee, Incheon (KR); Byung Gu Kang, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 364 days.

(21) Appl. No.: 18/300,616

(22) Filed: Apr. 14, 2023

(65) Prior Publication Data

US 2024/0162824 A1 May 16, 2024

(30) Foreign Application Priority Data

Nov. 16, 2022 (KR) .......................... 10-2022-0153747

(51) Int. Cl.
 *H02M 3/335* (2006.01)
 *B60L 53/22* (2019.01)
 *H02J 7/00* (2006.01)

(52) U.S. Cl.
 CPC ......... *H02M 3/33576* (2013.01); *B60L 53/22* (2019.02); *H02J 7/0048* (2020.01); *B60L 2210/10* (2013.01)

(58) Field of Classification Search
 CPC .. H02M 3/33576; H02M 3/335; H02J 7/0048; B60L 53/22; B60L 2210/10
 See application file for complete search history.

(56) References Cited

U.S. PATENT DOCUMENTS

| | | | | |
|---|---|---|---|---|
| 10,131,233 | B2 * | 11/2018 | Choi | ........................ B60L 58/20 |
| 11,021,062 | B2 * | 6/2021 | Shirahashi | ............ B60L 3/0084 |
| 2010/0078997 | A1 * | 4/2010 | Chen | ........................ B60L 1/00 |
| | | | | 307/31 |

FOREIGN PATENT DOCUMENTS

KR 20190114483 A 10/2019

* cited by examiner

*Primary Examiner* — Adolf D Berhane
(74) *Attorney, Agent, or Firm* — Slater Matsil, LLP (57) ABSTRACT

An embodiment vehicle includes a DC/DC converter having a first power terminal connected to a first electrode of a first battery, a second power terminal connected to a first electrode of a second battery, and a load terminal connected to a first end of an electric load, and including a switching circuit, a transformer, and a rectifier circuit, and a controller configured to set an operation mode of the DC/DC converter to a low-voltage DC/DC converter (LDC) mode or a state-of-charge (SOC) balancing mode, wherein the DC/DC converter is configured to step down a voltage of the first power terminal through the switching circuit, the transformer, and the rectifier circuit and output the voltage to the load terminal when the LDC mode is performed and to control power transfer between the first and second power terminals through the switching circuit when the SOC balancing mode is performed.

20 Claims, 5 Drawing Sheets

VEHICLE FOR CONVERTING POWER OF BATTERY AND METHOD OF CONTROLLING THE SAME

CROSS-REFERENCE TO RELATED APPLICATIONS

This application claims the benefit of Korean Patent Application No. 10-2022-0153747, filed on Nov. 16, 2022, which application is hereby incorporated herein by reference.

TECHNICAL FIELD

The present disclosure relates to a vehicle for converting power of a battery and a method of controlling the same.

BACKGROUND

In general, a vehicle may supply power to an electric load through a low-voltage DC/DC converter (LDC) that steps down a voltage of a high-voltage battery.

In particular, as part of a redundancy configuration for driving stability, an electrified vehicle, to which an autonomous driving system is applied, may include a plurality of LDCs to supply power of one high-voltage battery to each of a normal electric load and an electric load for autonomous driving.

In this instance, since the electric load for autonomous driving consumes more power than the normal electric load, fuel efficiency is reduced as a time during which an electric vehicle performs autonomous driving increases. This reduction in fuel efficiency may reduce a maximum driving distance possible on a full charge of the high-voltage battery.

In order to increase the maximum driving distance, a method of increasing battery capacity may be considered. However, this method has limitations since withstand voltage design of a motor system needs to be strengthened when the battery capacity increases.

Accordingly, when power is supplied to a plurality of electric loads using a high-voltage battery as in an electrified vehicle to which an autonomous driving system is applied, a method for preserving remaining capacity of the high-voltage battery is required.

The matters described as the background art above are only for improving understanding of the background of embodiments of the present disclosure and should not be taken as an admission that the matters correspond to prior art previously known to those skilled in the art.

SUMMARY

The present disclosure relates to a vehicle for converting power of a battery and a method of controlling the same. Particular embodiments relate to a vehicle having a main battery and a sub battery and for converting power of the main battery and the sub battery, and a method of controlling the same.

Therefore, embodiments of the present disclosure have been made in view of problems in the art, and an embodiment of the present disclosure provides a vehicle having a main high-voltage battery and a sub high-voltage battery and a method of controlling the same.

Another embodiment of the present disclosure provides power of a sub high-voltage battery to an electric load through a DC/DC converter and balances a state-of-charge (SOC) level between main and sub high-voltage batteries through the DC/DC converter when a certain condition is satisfied, thereby preserving the SOC level of the main and sub high-voltage batteries during driving.

A further embodiment of the present disclosure reduces the area and elements consumed in a power conversion system of a vehicle by one DC/DC converter providing an LDC mode in which power of a sub high-voltage battery is supplied to an electric load and an SOC balancing mode in which power transfer between main and sub high-voltage batteries is controlled.

Technical problems solvable by embodiments of the present disclosure are not limited to the technical problems mentioned above, and other technical problems not mentioned herein will be clearly understood by those skilled in the art from the description below.

An embodiment of the present disclosure provides a vehicle including a DC/DC converter having a first power terminal connected to one electrode of a first battery, a second power terminal connected to one electrode of a second battery, and a load terminal connected to one end of an electric load, and including a switching circuit, a transformer, and a rectifier circuit, and a controller configured to set an operation mode of the DC/DC converter to a low-voltage DC/DC converter (LDC) mode or a state-of-charge (SOC) balancing mode, in which the DC/DC converter steps down a voltage of the first power terminal through the switching circuit, the transformer, and the rectifier circuit and outputs the voltage to the load terminal when the LDC mode is performed, and controls power transfer between the first and second power terminals through the switching circuit when the SOC balancing mode is performed.

Another embodiment of the present disclosure provides a method of controlling a vehicle, the method including setting, by a controller, an operation mode of a DC/DC converter to an LDC mode or an SOC balancing mode, stepping down, by the DC/DC converter, a voltage of a first battery and outputting the voltage to an electric load when the LDC mode is performed, and controlling power transfer between the first battery and the second battery when the SOC balancing mode is performed.

BRIEF DESCRIPTION OF THE DRAWINGS

The following drawings attached to this specification illustrate preferred embodiments of the present disclosure and serve to help further understanding of the technical idea of the present disclosure together with the detailed description of embodiments of the present disclosure. Thus, embodiments of the present disclosure should not be construed as being limited only to the matters described in such drawings, in which.

DETAILED DESCRIPTION OF ILLUSTRATIVE EMBODIMENTS

Hereinafter, embodiments of the present disclosure will be described in detail with reference to the accompanying drawings, and the same or similar elements will be given the same reference numerals regardless of reference symbols, and redundant description thereof will be omitted.

In describing the embodiments disclosed in the present specification, when it is determined that a detailed description of related publicly known technology may obscure the gist of the embodiments disclosed in the present specification, the detailed description thereof will be omitted. The accompanying drawings are used to help easily describe various technical features and it should be understood that the embodiments presented herein are not limited by the accompanying drawings. As such, embodiments of the present disclosure should be construed to extend to any alterations, equivalents, and substitutes in addition to those which are particularly set out in the accompanying drawings.

In the description of the following embodiments, the term "preset" means that a value of a parameter is predetermined when the parameter is used in a process or algorithm. The value of the parameter may be set when a process or algorithm starts or may be set during a period during which a process or algorithm is performed, depending on embodiments.

Although terms including ordinal numbers, such as "first", "second", etc., may be used herein to describe various elements, the elements are not limited by these terms. These terms are generally only used to distinguish one element from another.

When an element is referred to as being "coupled" or "connected" to another element, the element may be directly coupled or connected to the other element. However, it should be understood that another element may be present therebetween. In contrast, when an element is referred to as being "directly coupled" or "directly connected" to another element, it should be understood that there are no other elements therebetween.

A singular expression includes the plural form unless the context clearly dictates otherwise.

In the present specification, it should be understood that a term such as "include" or "have" is intended to designate that the features, numbers, steps, operations, elements, parts, or combinations thereof described in the specification are present and does not preclude the possibility of addition or presence of one or more other features, numbers, steps, operations, elements, parts, or combinations thereof.

A controller may include a communication device that communicates with another controller or a sensor to control a function assigned thereto, a memory that stores an operating system, a logic command, input/output information, etc., and one or more processors that perform determination, calculation, decision, etc. necessary for controlling a function assigned thereto.

Figure 1:
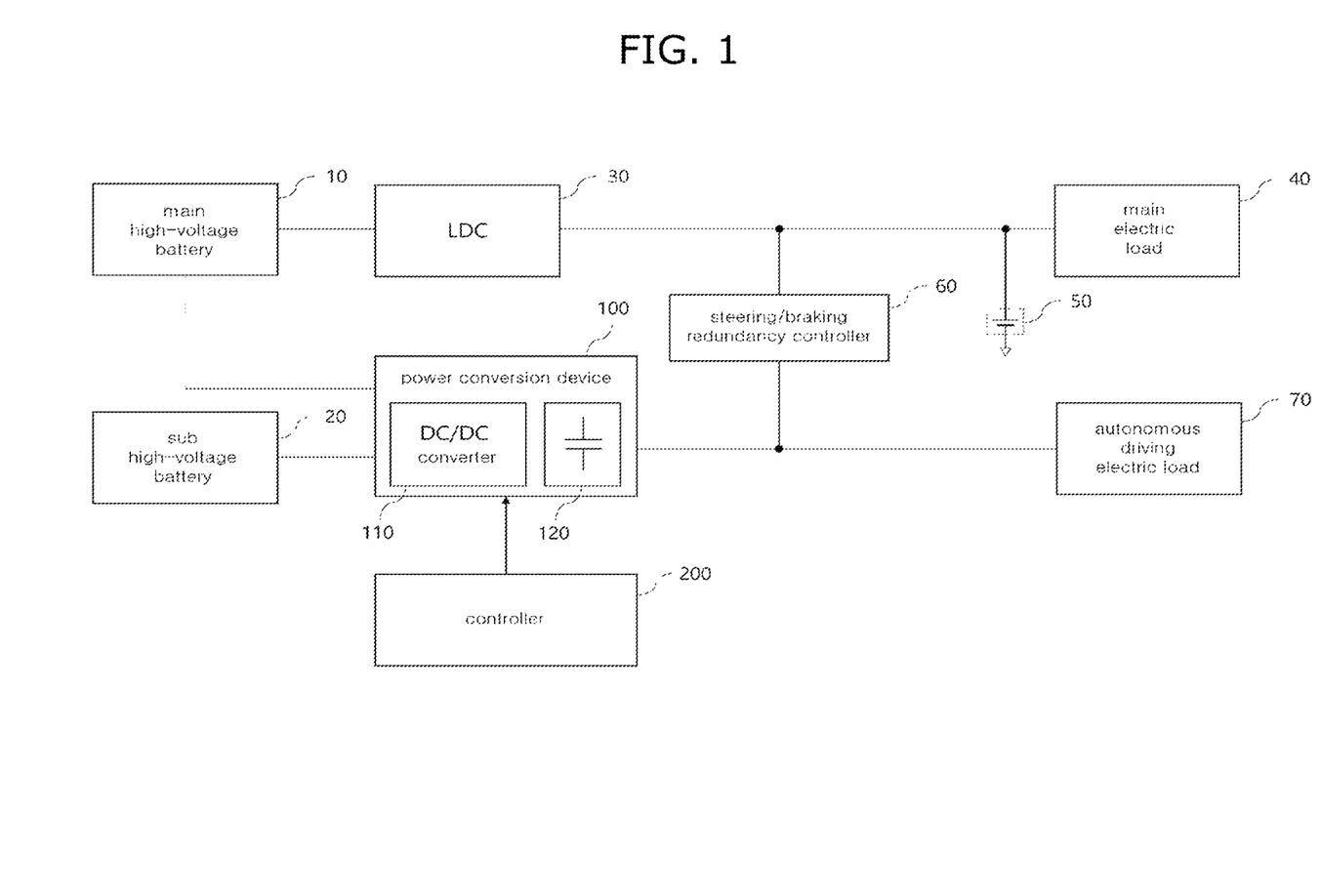
FIG. 1 is a block diagram illustrating a configuration of a power conversion system included in a vehicle according to an embodiment of the present disclosure.

FIG. 1 is a block diagram illustrating a configuration of a power conversion system included in a vehicle according to an embodiment of the present disclosure.

Referring to FIG. 1, the power conversion system may include a main high-voltage battery 10, a sub high-voltage battery 20, an LDC 30, a main electric load 40, a main auxiliary battery 50, a steering/braking redundancy controller 60, an autonomous driving electric load 70, a power conversion device 100, and a controller 200.

Even though the present embodiment corresponds to the case in which the power conversion system is applied to an autonomous electric vehicle, it will be apparent to those skilled in the art that the present disclosure may be applied to all vehicles each having a plurality of batteries.

Hereinafter, each component included in the power conversion system according to the present embodiment will be described.

The main high-voltage battery 10 may deliver power to a motor driving system of an electrified vehicle. The sub high-voltage battery 20 is provided to preserve an SOC level of the main high-voltage battery 10 and may have a voltage lower than that of the main high-voltage battery 10.

The LDC 30 may step down a voltage of the main high-voltage battery 10 and output the voltage to the main electric load 40 and the main auxiliary battery 50.

The main electric load 40 may include electric loads unrelated to an autonomous driving function.

The main auxiliary battery 50 may function as an auxiliary power supply for the main electric load 40.

As a part of a redundancy configuration for driving stability in an autonomous driving system, the steering/braking redundancy controller 60 may replace main controllers when a fault occurs in main controllers for each of a steering device and a braking device.

The autonomous driving electric load 70 may include a sensor for autonomous driving (for example, LiDAR, RADAR, an ultrasonic sensor, a camera, etc.), a processor that performs calculation for autonomous driving, etc.

The power conversion device 100 may include a DC/DC converter no and a sub auxiliary battery 120. At this time, the power conversion device 100 may be implemented in the form of a module in which the DC/DC converter no and the sub auxiliary battery 120 are mounted inside one housing to reduce size and weight. However, the present disclosure is not limited thereto.

An operation mode of the DC/DC converter no is determined by the controller 200, and the operation mode of the DC/DC converter no may be set to one of a low-voltage direct current conversion mode (hereinafter referred to as "LDC mode") or a state-of-charge balancing mode (hereinafter referred to as "SOC balancing mode").

The LDC mode may correspond to a mode in which the DC/DC converter no steps down a voltage of the sub high-voltage battery 20 and outputs the voltage to the sub auxiliary battery 120 and the autonomous driving electric load 70.

The SOC balancing mode may correspond to a mode in which the DC/DC converter no controls power transfer between the main high-voltage battery 10 and the sub high-voltage battery 20.

The SOC balancing mode may include a boost mode and a buck mode.

More specifically, the boost mode corresponds to a mode in which the DC/DC converter no boosts the voltage of the sub high-voltage battery 20 to charge the main high-voltage battery 10, and the buck mode may correspond to a mode in which the voltage of the main high-voltage battery 10 is stepped down to charge the sub high-voltage battery 20.

The DC/DC converter no according to the present embodiment may alleviate restrictions on vehicle operation due to discharge of any one of the main and sub high-voltage batteries 10 and 20 during driving by supplying power of the sub high-voltage battery 20 to the autonomous driving electric load 70 in the LDC mode and by balancing the SOC level between the main and sub high-voltage batteries 10 and 20 in the SOC balancing mode.

In addition, in the present embodiment, it is possible to reduce the area and elements consumed in the power conversion system of the vehicle by one DC/DC converter no performing both the LDC mode and the SOC balancing mode. A more detailed configuration and operation method of the DC/DC converter no will be described later with reference to FIG. 2.

The sub auxiliary battery 120 may function as an auxiliary power supply for the autonomous driving electric load 70. In addition, the sub auxiliary battery 120 may be implemented as an electrochemical capacitor, a so-called supercapacitor, to improve charge and discharge performance, prevent performance degradation due to deterioration, and reduce weight.

The controller 200 may set the operation mode of the DC/DC converter no to the LDC mode or the SOC balancing mode according to the SOC levels of the main high-voltage battery 10 and the sub high-voltage battery 20. Here, an SOC level corresponds to a ratio of remaining capacity of the battery to total capacity of the battery and may be expressed as a percentage (%).

The controller 200 may set the LDC mode to a default for the operation mode of the DC/DC converter no and set the operation mode of the DC/DC converter no from the SOC balancing mode to the boost mode or the buck mode when a predetermined condition is satisfied.

More specifically, when the SOC level of the sub high-voltage battery 20 is higher than a preset level in a state where the SOC level of the sub high-voltage battery 20 is higher than that of the main high-voltage battery 10, the operation mode of the DC/DC converter 110 may be set from the SOC balancing mode to the boost mode in order to charge the main high-voltage battery 10 with the power of the sub high-voltage battery 20. In this case, the preset level may be variously set according to embodiments. For example, the preset level may be set to 10(%).

In addition, when the SOC level of the sub high-voltage battery 20 is lower than the preset level in a state where the SOC level of the sub high-voltage battery 20 is lower than that of the main high-voltage battery 10, the controller 200 may switch the operation mode of the DC/DC converter no from the SOC balancing mode to the buck mode in order to charge the sub high-voltage battery 20 with power of the main high-voltage battery 10.

Hereinafter, the configuration and operation method of the power conversion device 100 will be described in detail with reference to FIG. 2.

Figure 2:
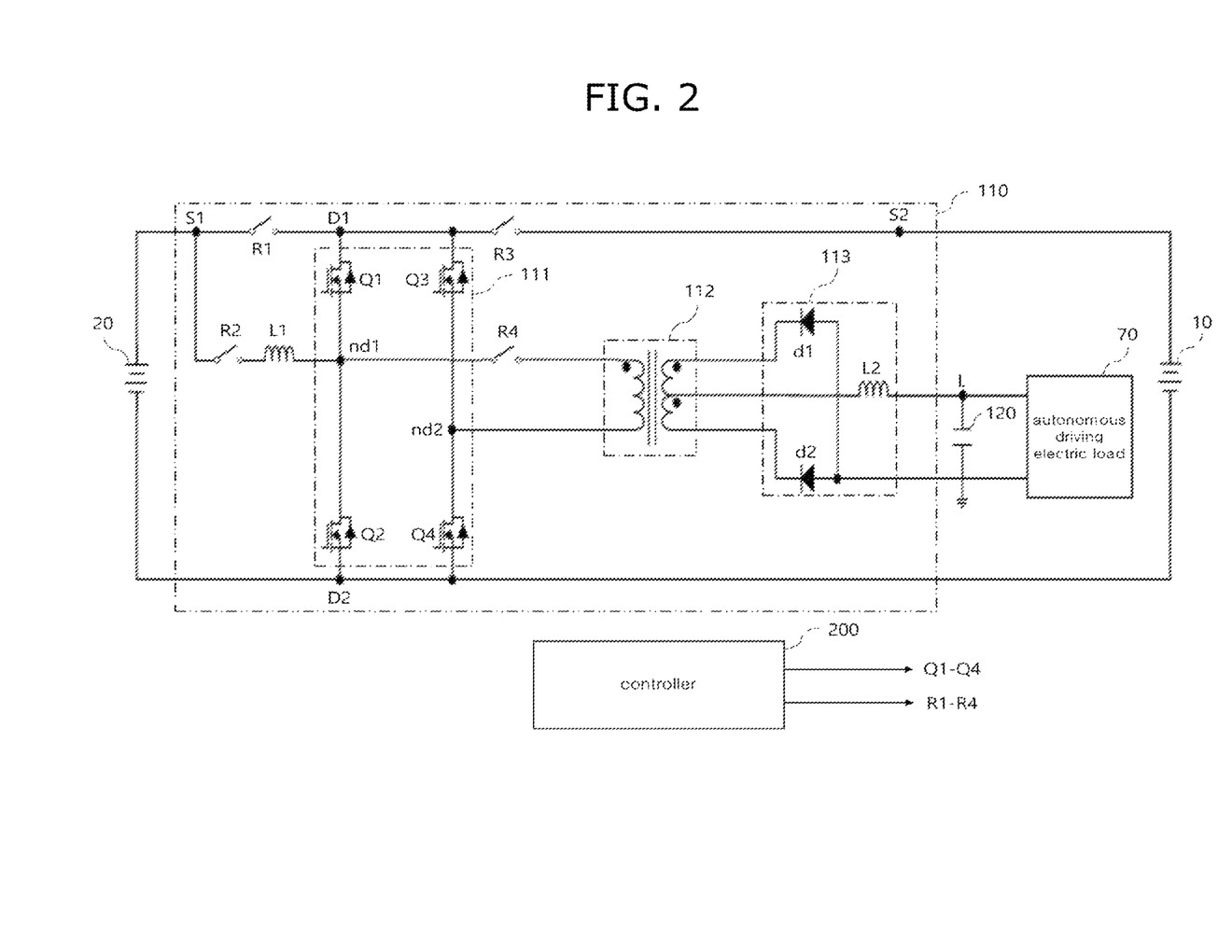
FIG. 2 is a circuit diagram illustrating an example of the power conversion system included in the vehicle according to an embodiment of the present disclosure.

FIG. 2 is a circuit diagram illustrating an example of the power conversion system included in the vehicle according to an embodiment of the present disclosure.

Referring to FIG. 2, the DC/DC converter no may have a first power terminal S1 connected to a positive electrode (+) of the sub high-voltage battery 20, a second power terminal S2 connected to a positive electrode (+) of the main high-voltage battery 10, and a load terminal L connected to one end of the autonomous driving electric load 70, and the DC/DC converter 110 may include a switching circuit in, a transformer 112, a rectifier circuit 113, an inductor L1, and a plurality of relays R1, R2, R3, and R4.

The switching circuit in may be electrically connected to the first power terminal S1 regardless of the operation mode of the DC/DC converter no through the first relay R1 and the second relay R2 and may be electrically connected to one of the second power terminal S2 and a primary-side coil of the transformer 112 according to the operation mode of the DC/DC converter no through the third relay R3 and the fourth relay R4.

The switching circuit 111 is implemented as a full-bridge circuit and may include a first leg Q1-Q2 and a second leg Q3-Q4 connected between a DC link D1 and a DC link D2. The DC link D2 may be connected to a negative electrode (−) of the sub high-voltage battery 20 and a negative electrode (−) of the main high-voltage battery 10.

The first leg Q1-Q2 may include a plurality of switching elements Q1 and Q2 having ends on one side connected to each other at a first internal node nd1, and the second leg Q3-Q4 may include a plurality of switching elements Q3 and Q4 having ends on one side connected to each other at a second internal node nd2. In this instance, the first internal node nd1 may be connected to one end of the primary-side coil of the transformer 112 through the fourth relay R4, and the second internal node nd2 may be connected to the other end of the primary-side coil of the transformer 112.

The transformer 112 may be disposed between the switching circuit in and the rectifier circuit 113 to electrically insulate the sub high-voltage battery 20 and the autonomous driving electric load 70 in the LDC mode.

The rectifier circuit 113 is implemented as a center-tapped rectifier and may include an inductor L2, a diode d1, and a diode d2. At this time, the inductor L2 may have one end connected to a center tap of a secondary-side coil of the transformer 112 and the other-side end connected to the load terminal L. One end of the diode d1 may be connected to one end of the secondary-side coil of the transformer 112, one end of the diode d2 may be connected to the other-side end of the secondary-side coil of the transformer 112, and the respective other-side ends of the diodes d1 and d2 may be connected to each other.

The first relay R1 may be connected between the first power terminal S1 and the DC link D1, and the second relay R2 may be connected in series with the inductor L1 between the first power terminal S1 and the first internal node nd1. In addition, the third relay R3 may be connected between the second power terminal S2 and the DC link D1, and the fourth relay R4 may be connected between the first internal node nd1 and one end of the primary-side coil of the transformer 112.

The sub auxiliary battery 120 is connected to the load terminal L and may be implemented as a supercapacitor as described above.

The controller 200 may control operating states of the plurality of relays R1 to R4 and control switching states of the switching elements Q1 to Q4 to change the topology of the DC/DC converter 110 according to the operation mode of the DC/DC converter 110.

An operation method in which the controller 200 controls the DC/DC converter 110 according to the operation mode of the DC/DC converter no will be described in detail with reference to FIGS. 3 and 4.

Figure 3:
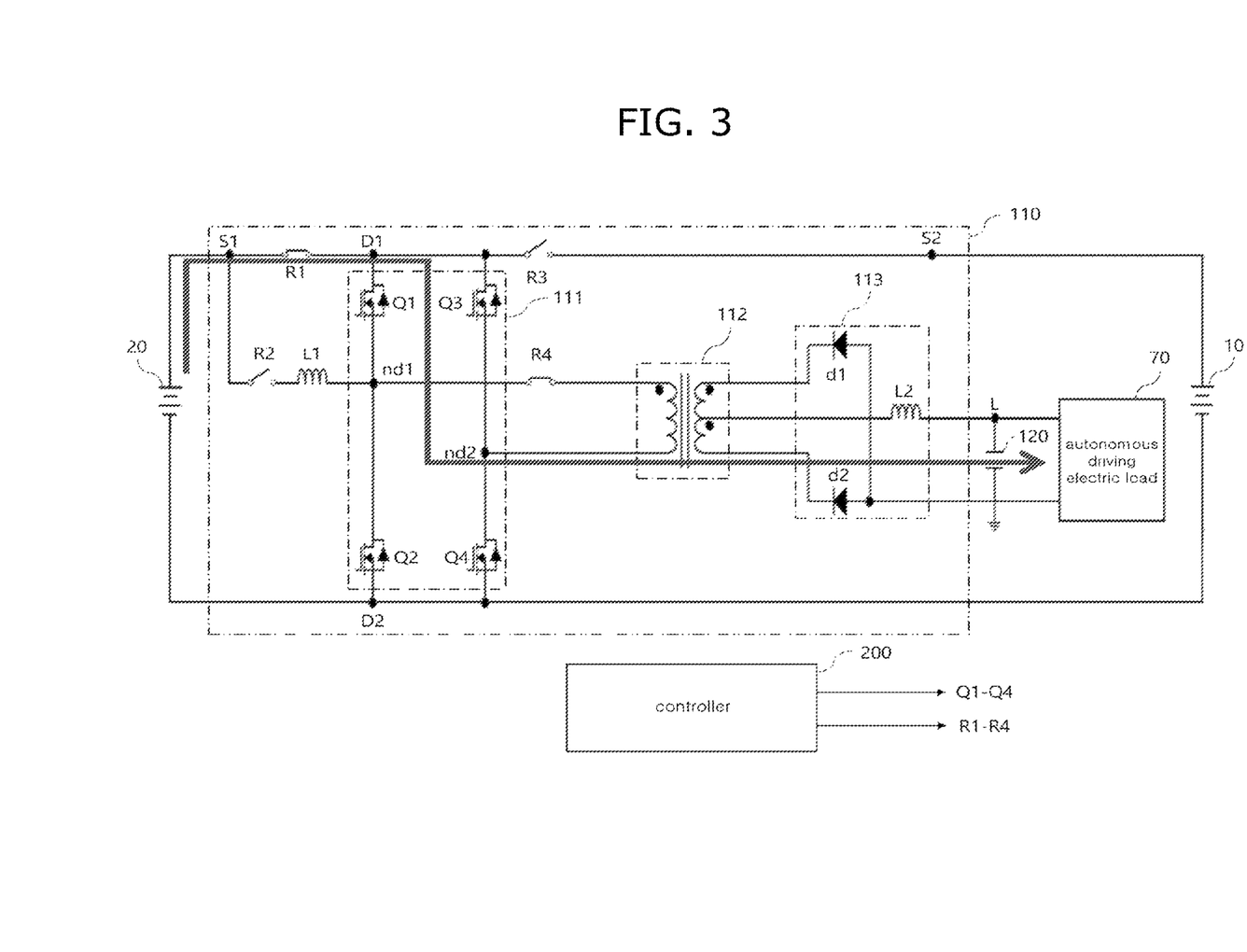
FIG. 3 is a diagram for describing a process in which an LDC mode is performed in the power conversion system according to an embodiment of the present disclosure.

FIG. 3 is a diagram for describing a process in which the LDC mode is performed in the power conversion system according to an embodiment of the present disclosure.

Referring to FIG. 3, a power flow of the power conversion system when the LDC mode is performed is illustrated. When the LDC mode is performed, power of the sub high-voltage battery 20 may be transferred to the autonomous driving electric load 70.

When the LDC mode is performed, the controller 200 may control the operating states of the plurality of relays R1 to R4 so that the DC/DC converter 110 operates as an LDC.

More specifically, when the LDC mode is performed, the controller 200 may perform a control operation to turn on the first relay R1 so that the first power terminal S1 and the DC link D1 are electrically connected to each other and may perform a control operation to turn off the second relay R2 so that the first power terminal S1 and the first internal node nd1 are electrically separated from each other. In addition, when the LDC mode is performed, the controller 200 may perform a control operation to turn off the third relay R3 so that the second power terminal S2 and the DC link D1 are electrically separated from each other and may perform a control operation to turn off the fourth relay R4 so that the first internal node nd1 and the second internal node nd2 are electrically connected to the primary-side coil of the transformer 112.

Accordingly, when the LDC mode is performed, the DC/DC converter 110 may step down the voltage of the first power terminal S1 through the switching circuit in, the transformer 112, and the rectifier circuit 113 and output the voltage to the load terminal L. At this time, in the LDC mode, the DC/DC converter 110 may switch the first leg Q1-Q2 and the second leg Q3-Q4 in order to step down the voltage of the first power terminal S1 and output the voltage to the load terminal L.

Figure 4:
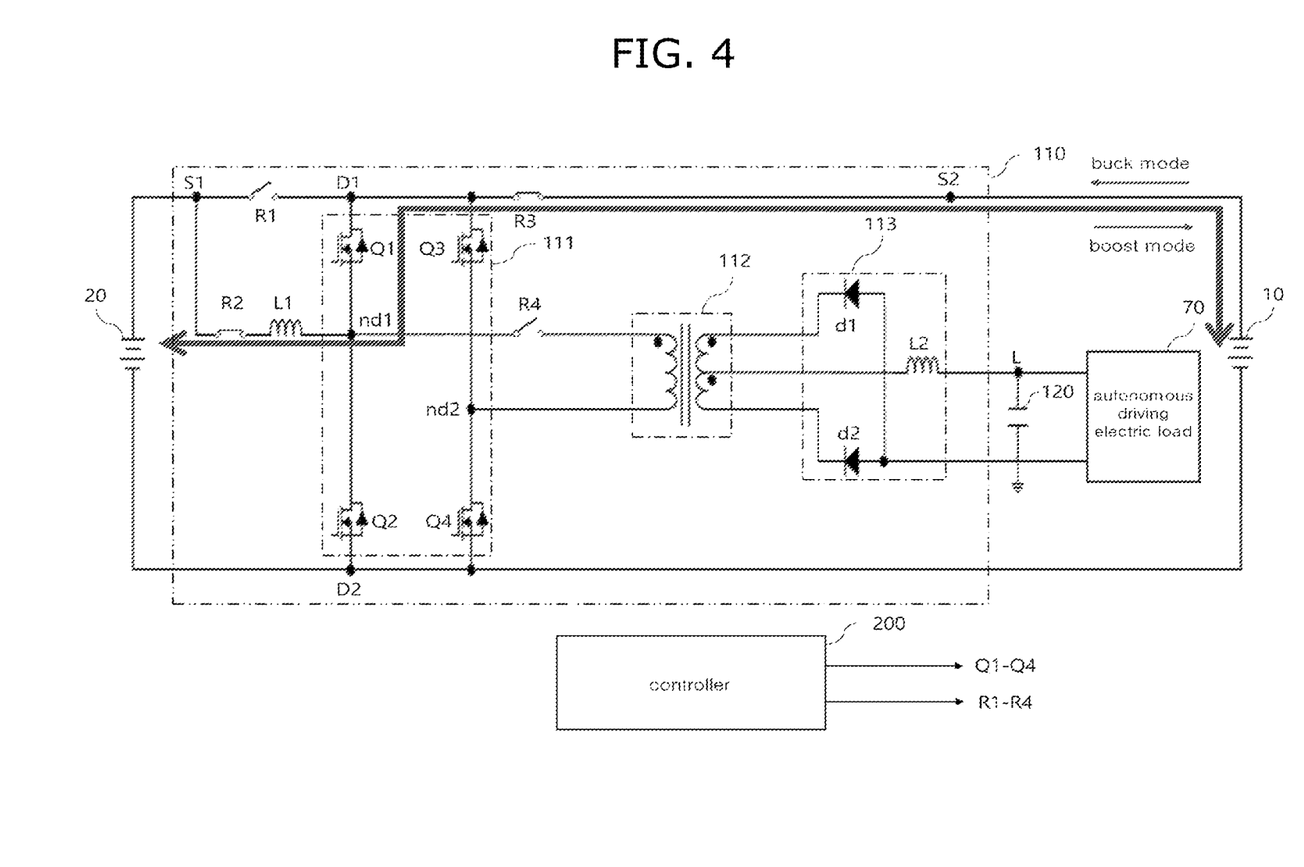
FIG. 4 is a diagram for describing a process in which an SOC balancing mode is performed in the power conversion system according to an embodiment of the present disclosure.

FIG. 4 is a diagram for describing a process in which an SOC balancing mode is performed in the power conversion system according to an embodiment of the present disclosure.

Referring to FIG. 4, a power flow of the power conversion system when the SOC balancing mode is performed is illustrated. When the boost mode is performed in the SOC balancing mode, as the power of the sub high-voltage battery 20 is transferred to the main high-voltage battery 10, the main high-voltage battery 10 may be charged. When the buck mode is performed in the SOC balancing mode, as the power of the main high-voltage battery 10 is transferred to the sub high-voltage battery 20, the sub high-voltage battery 20 may be charged.

When the SOC balancing mode is performed, the controller 200 may control the operating states of the plurality of relays R1 to R4 so that the DC/DC converter no operates as a bidirectional DC/DC converter.

More specifically, when the SOC balancing mode is performed, the controller 200 may perform a control operation to turn off the first relay R1 so that the first power terminal S1 and the DC link D1 are electrically separated from each other and may perform a control operation to turn on the second relay R2 so that the first power terminal S1 and the first internal node nd1 are electrically connected through the inductor L1. In addition, when the SOC balancing mode is performed, the controller 200 may perform a control operation to turn on the third relay R3 so that the second power terminal S2 and the DC link D1 are electrically connected to each other and may perform a control operation to turn off the fourth relay R4 so that the first internal node nd1 and the second internal node nd2 are electrically separated from the primary-side coil of the transformer 112.

Accordingly, when the SOC balancing mode is performed, the DC/DC converter 110 may control power transfer between the first power terminal S1 and the second power terminal S2 through the switching circuit in.

More specifically, when the boost mode is performed in the SOC balancing mode, the DC/DC converter no may switch the first leg Q1-Q2 in order to boost the voltage of the first power terminal S1 and output the voltage to the second power terminal S2. At this time, the DC/DC converter no may control a switching duty ratio of the switching element Q2.

In contrast, when the buck mode is performed in the SOC balancing mode, the DC/DC converter no may switch the first leg Q1-Q2 in order to step down the voltage of the second power terminal S2 and output the voltage to the first power terminal S1. At this time, the DC/DC converter no may control a switching duty ratio of the switching element Q1.

Figure 5:
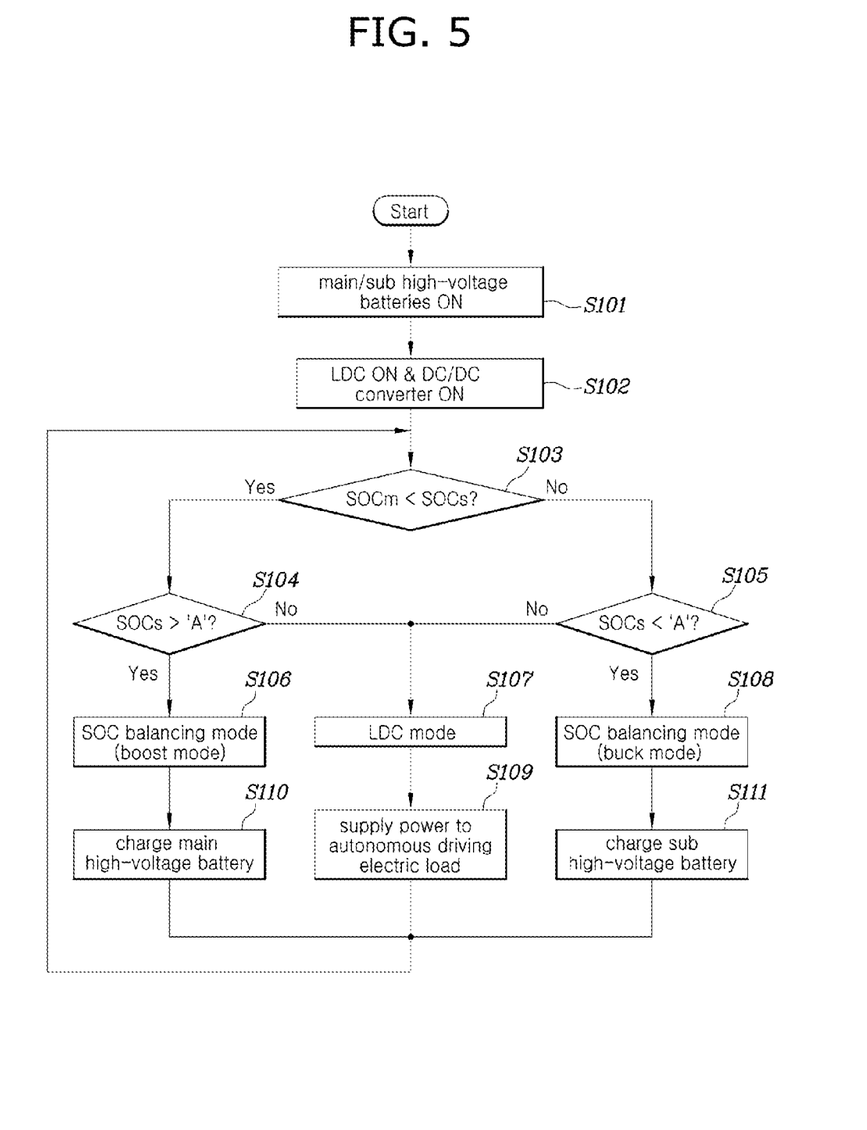
FIG. 5 is a flowchart for describing a method of controlling the vehicle according to an embodiment of the present disclosure.

FIG. 5 is a flowchart for describing a method of controlling the vehicle according to an embodiment of the present disclosure.

Referring to FIG. 5, after starting the vehicle, the main high-voltage battery 10 and the sub high-voltage battery 20 may be operated (S101), and the LDC 30 and the DC/DC converter no may be operated (S102). At this time, the LDC 30 may step down the voltage of the main high-voltage battery 10 and output the voltage to the main electric load 40 and the main auxiliary battery 50, and the DC/DC converter no may step down the voltage of the sub high-voltage battery 20 in the LDC mode and output the voltage to the autonomous driving electric load 70 and the sub auxiliary battery 120.

Thereafter, the controller 200 may set the operation mode of the DC/DC converter no to the LDC mode or the SOC balancing mode according to an SOC level SOCm of the main high-voltage battery 10 and an SOC level SOCs of the sub high-voltage battery 20 (S103 to S108).

More specifically, the controller 200 may determine whether the SOC level SOCs is greater than a preset level 'A' (S104) in a state where the SOC level SOCs is greater than the SOC level SOCm (YES in S103). The controller 200 may set the operation mode of the DC/DC converter no from the SOC balancing mode to the boost mode (S106) when the SOC level SOCs is greater than the preset level 'A' (YES in S104), and set the operation mode of the DC/DC converter no to the LDC mode (S107) when the SOC level SOCs is not greater than the preset level 'A' (NO in S104).

In addition, the controller 200 may determine whether the SOC level SOCs is less than the preset level 'A' (S105) in a state where the SOC level SOCs is not greater than the SOC level SOCm (NO in S103). The controller 200 may switch the operation mode of the DC/DC converter no from the SOC balancing mode to the buck mode (S108) when the SOC level SOCs is less than the preset level 'A' (YES in S105), and set the operation mode of the DC/DC converter no to the LDC mode (S107) when the SOC level SOCs is not less than the preset level 'A' (NO in S105).

When the LDC mode is performed, the DC/DC converter no may step down the voltage of the sub high-voltage battery 20 and output the voltage to the autonomous driving electric load 70 in order to supply power to the autonomous driving electric load 70 (S109).

In addition, when the SOC balancing mode is performed, the DC/DC converter 110 may control power transfer between the main high-voltage battery 10 and the sub high-voltage battery 20. More specifically, when the boost mode is performed in the SOC balancing mode, the DC/DC converter no may boost the voltage of the sub high-voltage battery 20 and output the voltage to the main high-voltage battery 10 in order to charge the main high-voltage battery 10 (S110). In addition, when the buck mode is performed in the SOC balancing mode, the DC/DC converter no may step down the voltage of the main high-voltage battery 10 and output the voltage to the sub high-voltage battery 20 in order to charge the sub high-voltage battery 20 (S111).

According to embodiments of the present disclosure, it is possible to provide power of a sub high-voltage battery to an electric load through a DC/DC converter and to balance a level of an SOC between main and sub high-voltage batteries through the DC/DC converter when a certain condition is satisfied, thereby preserving the level of the SOC of the main and sub high-voltage batteries during driving.

In addition, according to embodiments of the present disclosure, it is possible to reduce the area and elements consumed in a power conversion system of a vehicle by one DC/DC converter providing an LDC mode in which power of a sub high-voltage battery is supplied to an electric load and an SOC balancing mode in which power transfer between main and sub high-voltage batteries is controlled.

The effects obtainable by embodiments of the present disclosure are not limited to the above-mentioned effects, and other effects not mentioned herein may be clearly understood by those of ordinary skill in the art to which the present disclosure belongs from the above description.

Meanwhile, embodiments of the present disclosure as described above may be implemented as computer-readable code on a medium in which a program is recorded. The computer-readable medium includes all types of recording devices in which data readable by a computer system is stored. Examples of the computer-readable medium include a hard disk drive (HDD), a solid-state drive (SSD), a silicon disk drive (SDD), a ROM, a RAM, a CD-ROM, a magnetic tape, a floppy disk, an optical data storage device, etc. Therefore, the above detailed description should not be construed as restrictive and should be considered as illustrative in all respects. The scope of the present disclosure should be determined by a reasonable interpretation of the appended claims, and all modifications within the equivalent scope of the present disclosure are included in the scope of the present disclosure.

What is claimed is:

1. A vehicle comprising:
a DC/DC converter having a first power terminal connected to a first electrode of a first battery, a second power terminal connected to a first electrode of a second battery, and a load terminal connected to a first end of an electric load, the DC/DC converter comprising:
a switching circuit;
a transformer; and
a rectifier circuit; and
a controller configured to set an operation mode of the DC/DC converter to a low-voltage DC/DC converter (LDC) mode or a state-of-charge (SOC) balancing mode;
wherein the DC/DC converter is configured to:
step down a voltage of the first power terminal through the switching circuit, the transformer, and the rectifier circuit and output the voltage to the load terminal when the LDC mode is performed; and
control power transfer between the first and second power terminals through the switching circuit when the SOC balancing mode is performed.

2. The vehicle according to claim 1, wherein:
the switching circuit is electrically connected to the first power terminal and electrically connected to one of the second power terminal and a primary-side coil of the transformer according to the operation mode; and
the rectifier circuit is connected to a secondary-side coil of the transformer and the load terminal.

3. The vehicle according to claim 1, wherein:
the switching circuit comprises first and second legs connected to a DC link;
the first leg comprises a plurality of switching elements having ends on one side connected to each other at a first internal node; and
the second leg comprises a plurality of switching elements having ends on one side connected to each other at a second internal node.

4. The vehicle according to claim 3, wherein:
the controller is configured to perform a control operation so that the first power terminal and the DC link are electrically connected to each other when the LDC mode is performed; and
the DC/DC converter is configured to switch the first and second legs to step down a voltage of the first power terminal and output the voltage to the load terminal when the LDC mode is performed.

5. The vehicle according to claim 3, wherein:
when the SOC balancing mode is performed, the controller is configured to perform a control operation so that the first power terminal and the first internal node are electrically connected to each other through an inductor and to perform a control operation so that the second power terminal and the DC link are electrically connected to each other; and
when the SOC balancing mode is performed, the DC/DC converter is configured to switch the first leg to control power transfer between the first and second power terminals.

6. The vehicle according to claim 5, wherein:
the first internal node is connected to a first end of a primary-side coil included in the transformer;
the second internal node is connected to a second end of the primary-side coil; and
the controller is configured to perform a control operation so that the first and second internal nodes are electrically separated from the primary-side coil when the SOC balancing mode is performed.

7. The vehicle according to claim 5, wherein:
the SOC balancing mode comprises a boost mode and a buck mode; and
the DC/DC converter is configured to switch the first leg to boost a voltage of the first power terminal and output the voltage to the second power terminal when the boost mode is performed and to switch the first leg to step down a voltage of the second power terminal and output the voltage to the first power terminal when the buck mode is performed.

8. The vehicle according to claim 1, wherein the controller is configured to set the operation mode to the LDC mode or the SOC balancing mode according to SOC levels of the first and second batteries.

9. The vehicle according to claim 8, wherein:
when the SOC level of the first battery is greater than a preset level in a state where the SOC level of the first battery is greater than the SOC level of the second battery, the controller is configured to switch the operation mode from the SOC balancing mode to a boost mode; and
when the boost mode is performed, the DC/DC converter is configured to boost the voltage of the first power terminal through the switching circuit and output the voltage to the second power terminal.

10. The vehicle according to claim 9, wherein:
when the SOC level of the first battery is less than the preset level in a state where the SOC level of the first battery is less than the SOC level of the second battery, the controller is configured to switch the operation mode from the SOC balancing mode to a buck mode; and
when the buck mode is performed, the DC/DC converter is configured to step down a voltage of the second power terminal through the switching circuit and output the voltage to the first power terminal.

11. The vehicle according to claim 1, further comprising a supercapacitor connected to the load terminal.

12. The vehicle according to claim 1, further comprising an LDC configured to step down a voltage of the second battery and output the voltage to a main electric load.

13. A method of controlling a vehicle, the method comprising:
setting an operation mode of a DC/DC converter to an LDC mode or an SOC balancing mode;
stepping down a voltage of a first battery by the DC/DC converter;
outputting the voltage to an electric load when the LDC mode is performed; and
controlling power transfer between the first battery and a second battery when the SOC balancing mode is performed.

14. The method according to claim 13, wherein setting the operation mode comprises setting the operation mode according to SOC levels of the first and second batteries.

15. The method according to claim 14, wherein:
setting the operation mode comprises switching the operation mode from the SOC balancing mode to a boost mode when the SOC level of the first battery is greater than a preset level in a state where the SOC level of the first battery is greater than the SOC level of the second battery; and
controlling the power transfer comprises boosting the voltage of the first battery and outputting the voltage to the second battery when the boost mode is performed.

16. The method according to claim 15, wherein:
setting the operation mode further comprises setting the operation mode from the SOC balancing mode to a buck mode when the SOC level of the first battery is less than a preset level in a state where the SOC level of the first battery is less than the SOC level of the second battery; and
controlling the power transfer comprises stepping down a voltage of the second battery and outputting the voltage to the first battery when the buck mode is performed.

17. A power conversion system comprising:
a main high-voltage battery;
a sub high-voltage battery;
a DC/DC converter having a first power terminal connected to a first electrode of the main high-voltage battery, a second power terminal connected to a first electrode of the sub high-voltage battery, and a load terminal connected to a first end of an electric load, the DC/DC converter comprising:
a switching circuit;
a transformer; and
a rectifier circuit; and
a controller configured to set an operation mode of the DC/DC converter to a low-voltage DC/DC converter (LDC) mode or a state-of-charge (SOC) balancing mode, wherein the SOC balancing mode comprises a boost mode and a buck mode; and
wherein the DC/DC converter is configured to:
step down a voltage of the first power terminal through the switching circuit, the transformer, and the rectifier circuit and output the voltage to the load terminal when the LDC mode is performed; and
control power transfer between the first and second power terminals through the switching circuit when the SOC balancing mode is performed.

18. The power conversion system according to claim 17, wherein:
the switching circuit is electrically connected to the first power terminal and electrically connected to one of the second power terminal and a primary-side coil of the transformer according to the operation mode; and
the rectifier circuit is connected to a secondary-side coil of the transformer and the load terminal.

19. The power conversion system according to claim 17, wherein:
the switching circuit comprises first and second legs connected to a DC link;
the first leg comprises a plurality of switching elements having ends on one side connected to each other at a first internal node; and
the second leg comprises a plurality of switching elements having ends on one side connected to each other at a second internal node.

20. The power conversion system according to claim 17, wherein:
the controller is configured to set the operation mode to the LDC mode or the SOC balancing mode according to SOC levels of the main high-voltage battery and the sub high-voltage battery;
when the SOC level of the main high-voltage battery is greater than a preset level in a state where the SOC level of the main high-voltage battery is greater than the SOC level of the sub high-voltage battery, the controller is configured to switch the operation mode from the SOC balancing mode to the boost mode;
when the boost mode is performed, the DC/DC converter is configured to boost the voltage of the first power terminal through the switching circuit and output the voltage to the second power terminal;
when the SOC level of the main high-voltage battery is less than the preset level in a state where the SOC level of the main high-voltage battery is less than the SOC level of the sub high-voltage battery, the controller is configured to switch the operation mode from the SOC balancing mode to the buck mode; and
when the buck mode is performed, the DC/DC converter is configured to step down a voltage of the second power terminal through the switching circuit and output the voltage to the first power terminal.

* * * * *